United States Patent
Hirozawa

(10) Patent No.: US 9,077,272 B2
(45) Date of Patent: Jul. 7, 2015

(54) SLEWING-TYPE WORKING MACHINE

(75) Inventor: Mitsunori Hirozawa, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 157 days.

(21) Appl. No.: 13/982,946

(22) PCT Filed: Dec. 28, 2011

(86) PCT No.: PCT/JP2011/007338
§ 371 (c)(1),
(2), (4) Date: Jul. 31, 2013

(87) PCT Pub. No.: WO2012/104953
PCT Pub. Date: Aug. 9, 2012

(65) Prior Publication Data
US 2013/0307443 A1    Nov. 21, 2013

(30) Foreign Application Priority Data

Feb. 2, 2011 (JP) .................................. 2011-020759

(51) Int. Cl.
*H02P 1/00* (2006.01)
*H02P 3/04* (2006.01)
(Continued)

(52) U.S. Cl.
CPC ................ *H02P 27/00* (2013.01); *E02F 9/128* (2013.01); *E02F 9/2091* (2013.01);
(Continued)

(58) Field of Classification Search
CPC ....... H02P 3/04; Y02T 10/7005; B60W 10/08
USPC ........... 318/139, 362, 369, 371, 372; 60/327, 60/466
See application file for complete search history.

(56) References Cited

U.S. PATENT DOCUMENTS 6,666,022 B1 *  12/2003  Yoshimatsu et al. ............ 60/413
6,922,990 B2 *   8/2005  Naruse et al. ................... 60/414
(Continued)

FOREIGN PATENT DOCUMENTS

CN          1668835 A      9/2005
JP          2002 359935   12/2002
(Continued)

OTHER PUBLICATIONS

International Search Report Issued Apr. 17, 2012 in PCT/JP11/007338 Filed Dec. 28, 2011.

*Primary Examiner* — Paul Ip
(74) *Attorney, Agent, or Firm* — Oblon, McClelland, Maier & Neustadt, L.L.P.

(57) ABSTRACT

A slewing-type working machine includes: an electric storage device capable of being charged with regenerative electric power for regenerating slewing energy of an upper slewing body while functioning as an electric power source for an electric slewing motor; an electric storage device and electric storage device controller detecting whether the electric storage device is under a normal condition with sufficient capacity to regenerate the slewing energy or under an abnormal condition without sufficient capacity; and a controller controlling a velocity of the electric slewing motor based on a result of detection by the electric storage device and electric storage device controller, wherein the controller performs a velocity limiting control for limiting a maximum velocity of the electric slewing motor when the electric storage device is under the abnormal condition.

8 Claims, 8 Drawing Sheets

(51) Int. Cl.

| | |
|---|---|
| *H02P 27/00* | (2006.01) |
| *E02F 9/12* | (2006.01) |
| *E02F 9/20* | (2006.01) |
| *E02F 9/26* | (2006.01) |
| *B60L 1/00* | (2006.01) |
| *B60L 7/10* | (2006.01) |
| *B60L 11/14* | (2006.01) |
| *B60L 11/18* | (2006.01) |

(52) U.S. Cl.
 CPC ............. *E02F 9/2095* (2013.01); *E02F 9/268* (2013.01); *B60L 1/003* (2013.01); *B60L 1/20* (2013.01); *B60L 7/10* (2013.01); *B60L 11/14* (2013.01); *B60L 11/1862* (2013.01); *B60L 2200/42* (2013.01); *B60L 2240/421* (2013.01); *B60L 2240/545* (2013.01); *B60L 2240/80* (2013.01); *Y02T 10/7077* (2013.01); *Y02T 10/7044* (2013.01); *Y02T 10/7005* (2013.01); *Y02T 10/705* (2013.01); *Y02T 10/642* (2013.01); *Y02T 10/92* (2013.01); *Y02T 10/70* (2013.01)

(56) References Cited

U.S. PATENT DOCUMENTS

| | | | |
|---|---|---|---|
| 8,405,328 B2 * | 3/2013 | Komiyama et al. | 318/369 |
| 2004/0098983 A1 * | 5/2004 | Naruse et al. | 60/428 |
| 2006/0096799 A1 | 5/2006 | Tatsuno et al. | |
| 2008/0018271 A1 | 1/2008 | Morinaga et al. | |
| 2011/0227512 A1 * | 9/2011 | Komiyama et al. | 318/369 |

FOREIGN PATENT DOCUMENTS

| | | |
|---|---|---|
| JP | 2009 235707 | 10/2009 |
| JP | 2010 41828 | 2/2010 |
| JP | 2010 173599 | 8/2010 |
| WO | 2006 004080 | 1/2006 |

\* cited by examiner

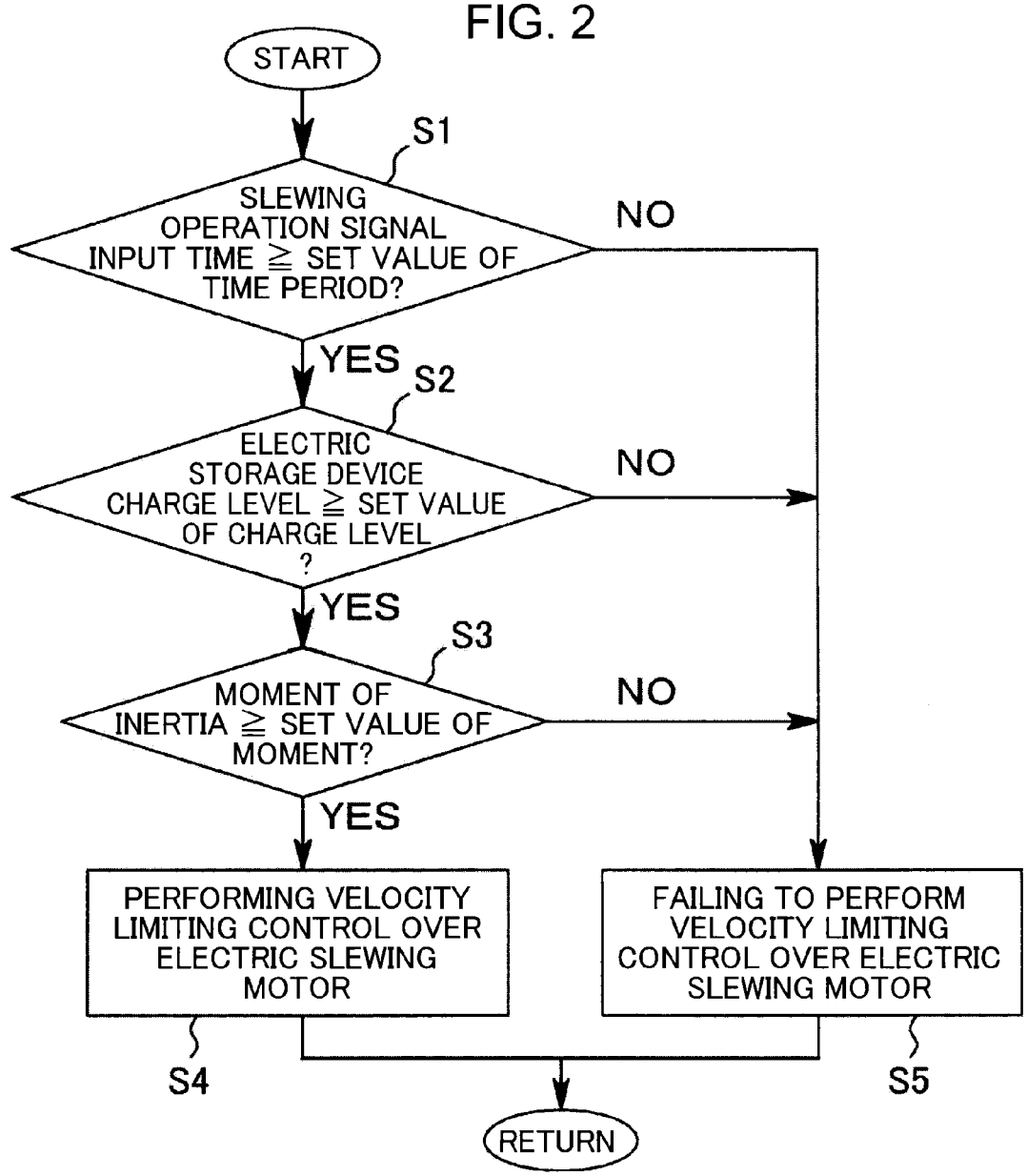
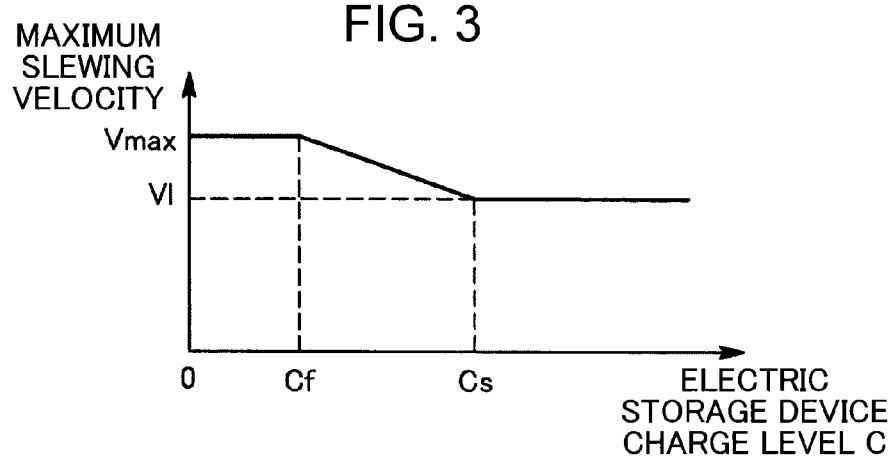

SLEWING-TYPE WORKING MACHINE

TECHNICAL FIELD

The present invention relates to a slewing-type working machine, such as a shovel, having an electric motor for slewing a slewing body.

BACKGROUND ART

Description will be made of the background art by way of a shovel as an example.

A shovel shown in FIG. 13 includes a lower propelling body 1 of crawler type, a upper slewing body 2 mounted on the lower propelling body 1 so as to be rotatable about an axis O vertical to the ground, and a working attachment A provided on the upper slewing body 2 so as to be movable upwardly and downwardly. The working attachment A includes a boom 3, an arm 4, a bucket 5, a boom cylinder 6, an arm cylinder 7, and a bucket cylinder 8.

Known examples of such shovels include a hybrid-type shovel (see Patent Document 1) and an electrically driven-type shovel (hereinafter will be referred to as an "electrically-driven slewing-type shovel"). Such an electrically-driven slewing-type shovel uses a slewing power source comprising either an electric motor or a hydraulic motor and an electric motor. In the electrically-driven slewing-type shovel, a slewing driving force is generated by driving an electric slewing motor by an electric storage device. During slewing braking, on the other hand, regenerative electric power and regenerative braking force are generated by the electric slewing motor while regenerating slewing energy by charging the electric storage device with the regenerative electric power in the electrically-driven slewing-type shovel.

In the electrically-driven slewing-type shovel, the regenerative electric power cannot sufficiently be taken in the electric storage device when the electric storage device has a high charge level. Therefore, the slewing energy cannot sufficiently be regenerated.

The same holds true for cases where the electric storage device has a decreased capacity due to temperature, aging deterioration, or the like.

In such a situation, an energy loss incurs for the reason that a portion of the slewing energy which has failed to be regenerated has to be consumed by a regenerative resistance and a like reason. Further, the slewing braking force becomes insufficient, which gives rise to a state so-called "overrun of slewing" such that a desired stop position is passed through.

When the electric storage device is overcharged, it is possible that the performance and life of the electric storage device are deleteriously affected.

Patent Document 1: WO 2006/004080

SUMMARY OF THE INVENTION

An object of the present invention is to provide a stewing-type working machine which is capable of preventing a electric storage device from being overcharged while obtaining an appropriate slewing braking force by efficiently regenerating slewing energy during slewing braking.

In order to solve the problems mentioned above, the present invention provides a slewing-type working machine including: a lower propelling body; a upper slewing body rotatably provided on the lower propelling body; an electric stewing motor which causes the upper stewing body to slew, and which generates regenerative braking force and regenerative electric power during slewing braking of the upper stewing body; a electric storage device which functions as a electric power source for the electric slewing motor, which capable of being charged with the regenerative electric power to regenerating slewing energy of the upper stewing body; electric storage device condition detecting means which detects whether the electric storage device is under a normal condition with sufficient capacity to regenerate the slewing energy or under an abnormal condition without sufficient capacity; and control means which controls a velocity of the electric slewing motor based on a result of detection by the electric storage device condition detecting means, wherein the control means performs a velocity limiting control for limiting a maximum velocity of the electric slewing motor when the electric storage device is under the abnormal condition.

According to the present invention, it is possible to prevent the electric storage device from being overcharged as well as to obtain an appropriate slewing braking force by efficiently regenerating slewing energy during slewing braking.

BRIEF DESCRIPTION OF THE DRAWINGS

FIG. 2 is a flowchart illustrating a process carried out by control means shown in FIG. 1.

FIG. 3 is a diagram illustrating the relationship between the charge level of a electric storage device and the maximum slewing velocity according to the first embodiment.

MODE FOR CARRYING OUT THE INVENTION

Hereinafter, embodiments of the present invention will be described with reference to the attached drawings. The embodiments described below are each an example embodying the present invention and are not intended to limit the technical scope of the present invention.

A hybrid shovel is exemplified in the following embodiments.

Figure 13:
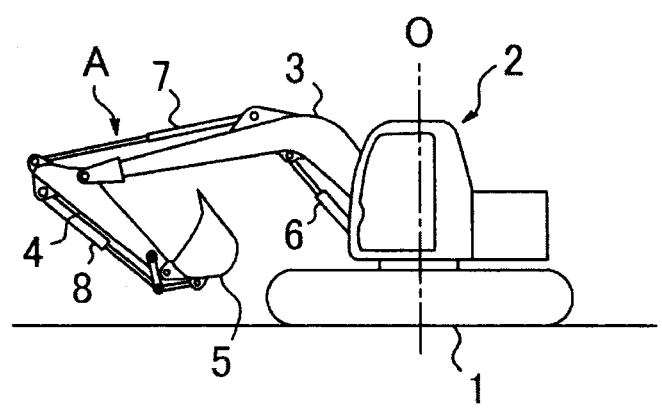
FIG. 13 is a schematic side view of a shovel.

Specifically, a hybrid shovel as illustrated in FIG. 13 includes a lower propelling body 1 of crawler type, a upper slewing body 2 provided on the lower propelling body 1 so as to be rotatable about an axis O vertical to the ground, a working attachment A provided on the upper slewing body 2 so as to be movable upwardly and downwardly, and a system to be described below.

The working attachment A includes a boom 3 having a base end mounted on the upper slewing body 2 for up-and-down movement, an arm 4 having a base end pivotally mounted on a front end of the boom 3, and a bucket 5 pivotally mounted on a front end of the arm 4. The working attachment A also includes a boom cylinder 6 for causing the boom 3 to move up and down relative to the upper slewing body 2, an arm cylinder 7 for causing the arm 4 to pivot relative to the boom 3, and a bucket cylinder 8 for causing the bucket 5 to pivot relative to the arm 4. In the following description, the cylinders 6 to 8, a motor for traveling of the lower propelling body 1 (not shown) and the like will be generally referred to as a "hydraulic actuator 15" (see FIG. 2) as the case may be.

First Embodiment

See FIGS. 1 to 6

Figure 1:
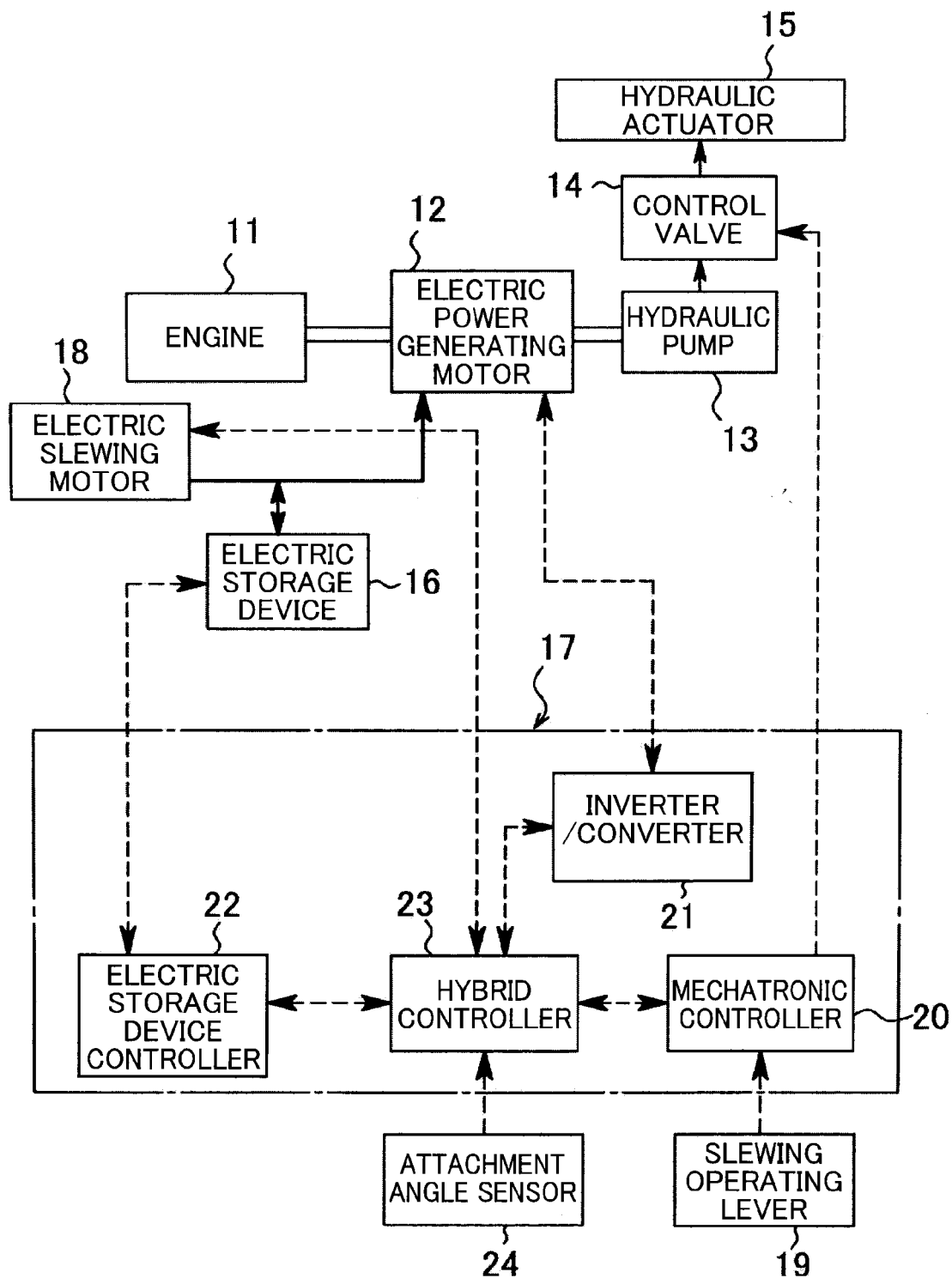
FIG. 1 is a block diagram illustrating a system as a first embodiment of the present invention.

FIG. 1 illustrates a system configuration of the first embodiment.

In FIG. 1, a thick solid line, a broken line and a thin solid line represent a circuit of a power system, a circuit of a signal system, and a hydraulic circuit, respectively.

The hybrid shovel includes an engine 11, an electric power generating motor 12 and a hydraulic pump 13 which are driven by the engine 11, a hydraulic actuator 15 driven by hydraulic oil supplied thereto from the hydraulic pump 13, a control valve 14 for controlling supply and drainage of the hydraulic oil with respect to the hydraulic actuator 15, an electric slewing motor 18 for causing the upper slewing body 2 to rotate, a electric storage device 16 electrically connected to the electric power generating motor 12 and the electric slewing motor 18, control means 17 controlling the operations of the electric power generating motor 12, control valve 14, electric storage device 16 and electric slewing motor 18, and an attachment angle sensor 24 and a slewing operating lever 19 which are electrically connected to the control means 17.

As shown, the electric power generating motor 12 and the hydraulic pump 13 are connected in tandem (or parallel) with the engine 11. The electric power generating motor 12 has the functions of an electric power generator and an electric motor.

Though the control valve 14 is provided for each of plural actuators, the control valve 14 in FIG. 1 represents an assembly of plural control valves.

Though FIG. 1 illustrates the case where only one hydraulic pump 13 is connected to the engine 11, the system may have a plurality of hydraulic pumps connected in series or parallel with the engine 11.

The electric storage device 16 such as a nickel-hydrogen battery or a lithium ion battery, which serves as an electric power source, is connected to the electric power generating motor 12. The electric power generating motor 12 can be switched by control signals from the control means 17 between a state of functioning as an electric motor by utilizing discharge of the electric storage device 16 in accordance with the charged level and a state of functioning as an electric generator.

In other words, when the charge level of the electric storage device 16 is decreased, the electric power generating motor 12 performs the function of the electric power generator to generate electric power, which in turn is fed to the electric storage device 16 to charge the electric storage device 16. On the other hand, when the charge level of the electric storage device 16 is a dischargeable level, the electric power generating motor 12 performs the function of electric motor by utilizing the electric power of the electric storage device 16, thereby providing assistance to the engine 11.

The electric slewing motor 18 is electrically connected to the electric power generating motor 12 and the electric storage device 16. The electric slewing motor 18 is driven for slewing by the electric power generated by the electric power generating motor 12 and/or the electric power stored in the electric storage device 16.

The control means 17 includes a mechatronic controller 20 controlling the operation of the control valve 14 based on an operation of the slewing operating lever 19 serving as a slewing operating section, an inverter/converter 21 controlling the operation of the electric power generating motor 12, a electric storage device controller 22 controlling charge/discharge of the electric storage device 16, and a hybrid controller 23 as a main controller outputting various command signals to the mechatronic controller 20, inverter/converter 21 and electric storage device controller 22.

The electric storage device controller 22 constantly detects and monitors the charge level and capacity of the electric storage device 16 as information for the charge/discharge control of the electric storage device 16. Information on the charge level detected by the electric storage device controller 22 is transferred to the hybrid controller 23. That is, the electric storage device controller 22 also serves as electric storage device condition detecting means (charge level detecting means). More specifically, the electric storage device 16 and the electric storage device controller 22 form the electric storage device condition detecting means (charge level detecting means) in the present embodiment.

The attachment angle sensor 24 detects the angle of the boom 3 relative to the upper slewing body 2, the angle of the arm 4 relative to the boom 3, and the angle of the bucket 5 relative to the arm 4. Angle signals resulting from detection by the attachment angle sensor 24 are transferred to the hybrid controller 23.

The slewing operating lever (slewing operating section) 19 serves to output velocity commands to the electric slewing motor 18. Information on the amount of operation of the slewing operating lever 19 (slewing operation amount) is transferred to the hybrid controller 23 via the mechatronic controller 20.

The hybrid controller 23 performs the following velocity control over the electric slewing motor 18 based on the slewing operation amount, the charge level of the electric storage device 16 and the angle signals indicative of the angles of the attachments.

(I) Control Under Normal Condition

When the electric storage device 16 is under a normal condition having a charge level with sufficient capacity to regenerate slewing energy (the charge level is less than a preset charge level value Cs shown in FIG. 3), a maximum slewing velocity is set in accordance with the charge level. Specifically, the slewing velocity is controlled in such a manner as to change linearly and continuously between 0 (stationary condition) and maximum velocity Vmax under the normal condition in accordance with the amount of operation of the slewing operating lever 19 as plotted by dashed double-dotted line X in FIG. 4. More specifically, the slewing velocity is controlled such that the slewing velocity is 0 when the amount of operation of the slewing operating lever 19 is 0 while reaching the maximum velocity Vmax at the maximum amount of operation (full stroke Smax) of the slewing operating lever 19.

That is, the normal condition is assumed as a condition which allows the slewing energy to be wholly regenerated as regenerative electric power and regenerative braking force during slewing braking. For this reason, any limitation is not imposed on the maximum velocity of the electric slewing motor 18 under the normal condition.

The hybrid controller 23 determines the moment of inertia of the entire working attachment A by calculation based on the angles of the boom, arm and bucket detected by the attachment angle sensor 24. That is, the attachment angle sensor 24 and the hybrid controller 23 form moment-of-inertia detecting means in the present embodiment.

Under the normal condition, however, a limitation in accordance with the moment of inertia is not imposed on the maximum velocity.

Instead of the moment of inertia determined from all the angles of the boom, arm and bucket, a moment of inertia determined from the angles of two of these attachments (especially the boom and the arm) may be used.

The voltage of the electric storage device 16 drops immediately after the start of slewing. For this reason, the condition (charge level) of the electric storage device 16 might be erroneously detected because of such a voltage drop.

Figure 6:
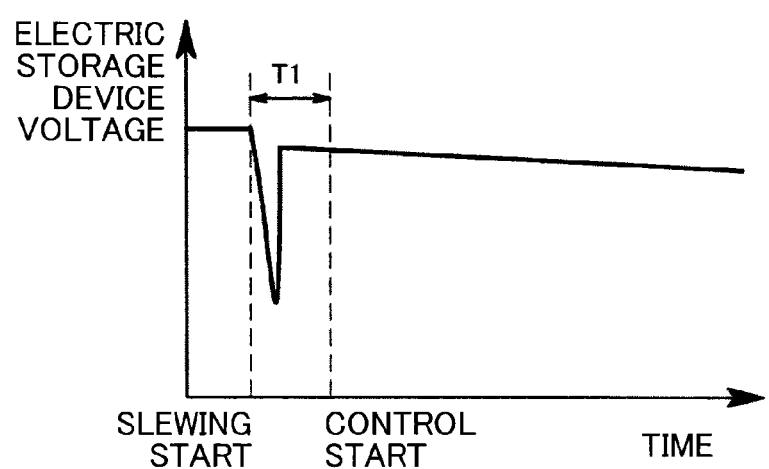
FIG. 6 is a diagram illustrating the relationship between the slewing operation time and the voltage of the electric storage device according to the first embodiment.

Therefore, the control is started after lapse of a predetermined time period T1 from the start of the slewing operation, as shown in FIG. 6. Specifically, the erroneous detection can be avoided by performing the detection of the condition of the electric storage device 16 (e.g., step S2 of FIG. 2) after lapse of the predetermined time period T1.

(II) Control Under Abnormal Condition

A condition in which the charge level of the electric storage device 16 is equal to or more than the preset charge level value Cs shown in FIG. 3 is determined to be an abnormal condition in which the electric storage device 16 does not have sufficient capacity to regenerate the whole slewing energy. Under such an abnormal condition, the maximum slewing velocity (maximum velocity of the electric slewing motor 18) is limited to a limit value Vl previously set.

Figure 4:
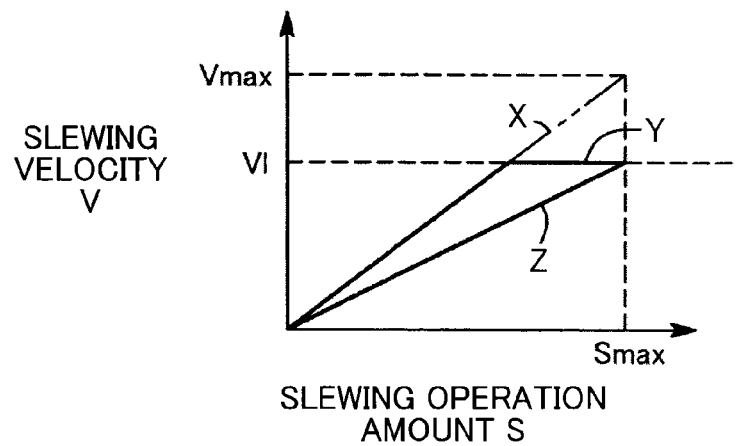
FIG. 4 is a diagram illustrating the amount of slewing operation and the slewing velocity according to the first embodiment.
Figure 5:
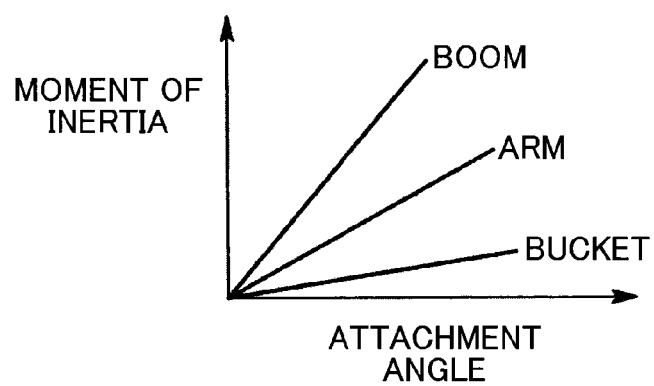
FIG. 5 is a diagram illustrating the relationship between the angle of a working attachment and the moment of inertia.

In this case, it is possible that increase in slewing velocity with increasing slewing operation amount is stopped at the time the velocity reaches the limit value Vl for limiting the velocity and, thereafter, the slewing velocity is held constant (at the limit value) irrespective of the increase in slewing operation amount, as plotted by thick line Y in FIG. 4.

By so doing, however, the velocity stops increasing in the middle of operation. For this reason, the operator feels a gap from the operability under the normal condition. Thus, there is some fear of degradation in operability.

In view of this, as shown by thick line Z, it is desirable that a velocity gain relative to an amount of operation be set (changed from the normal condition) such that the velocity varies continuously up to the limit value in accordance with all the amounts of operation. Specifically, the velocity gain relative to the amount of operation can be set such that the velocity of the electric slewing motor 18 varies continuously in accordance with the amount of operation of the slewing operating lever 19 over the entire operation range of the slewing operating lever 19 while reaching the limit value Vl at the maximum amount of operation of the slewing operating lever 19.

By so doing, the gap from the operation under the normal condition can be lessened to better the operability.

Under the normal condition in which the charge level C of the electric storage device 16 is less than the preset charge level value Cs, any limitation need not be imposed on the velocity of the electric slewing motor 18. Even under the normal condition, however, the velocity of the electric slewing motor 18 may be limited as shown in FIG. 3. Specifically, the maximum velocity of the electric slewing motor 18 may be gradually lowered toward the limit value Vl when the charge level C of the electric storage device 16 falls within a range from a value of not less than a second set value Cf to a value of less than the preset charge level value Cs.

The process carried out by the control means 17 will be described with reference to the flowchart of FIG. 2.

In step S1, it is determined whether or not slewing operation signal input time has exceeded a predetermined set value of time period. If it is determined to be "YES" (if the slewing operation signal input time is determined to have exceeded the predetermined set value of time period) in step S1, determination is made in step S2 as to whether or not the charge level of the electric storage device 16 is equal to or more than the preset charge level value Cs.

If it is determined to be "YES" in step S2, determination is made in step S3 as to whether or not the moment of inertia of the working attachment is equal to or more than a predetermined set value of moment. If it is determined to be "YES" in step S3, the current condition is determined to be the abnormal condition. When the current condition is determined to be the abnormal condition, a velocity limiting control for limiting the maximum velocity of the electric slewing motor 18 is performed in step S4.

The limit value is set as a slewing velocity which allows substantially the whole slewing energy to be regenerated even when the charge level of the electric storage device 16 is equal to or more than the preset charge level value Cs.

If it is determined to be "NO" in any one of steps S1 to S3, the current condition is determined to be the normal condition which allows the slewing energy to be sufficiently regenerated without necessitating the velocity limiting control and the process proceeds to step S5. In step S5, the velocity limiting control is not performed over the electric slewing motor 18. That is, a normal control for causing the velocity of the electric slewing motor 18 to vary continuously up to the maximum velocity Vmax corresponding to the maximum amount of operation Smax in accordance with the amount of operation of the slewing operating lever 19, is performed.

In this way, the embodiment described above is configured to limit generation of slewing energy itself by limiting the maximum velocity of the electric slewing motor 18 under the situation in which the slewing energy to be regenerated is excessive relative to the charge level of the electric storage device 16. Therefore, it is possible to regenerate energy with no waste, ensure a reliable slewing braking action and prevent the electric storage device 16 from being overcharged.

The slewing energy and the braking energy opposed thereto vary with the moment of inertia of the working attachment A shown in FIG. 13. Therefore, when the electric storage device 16 is under the abnormal condition as described above, reliable velocity limiting can be realized with no waste by performing velocity limiting when the moment of inertia is equal to or more than the set value.

Second Embodiment

Figure 7:
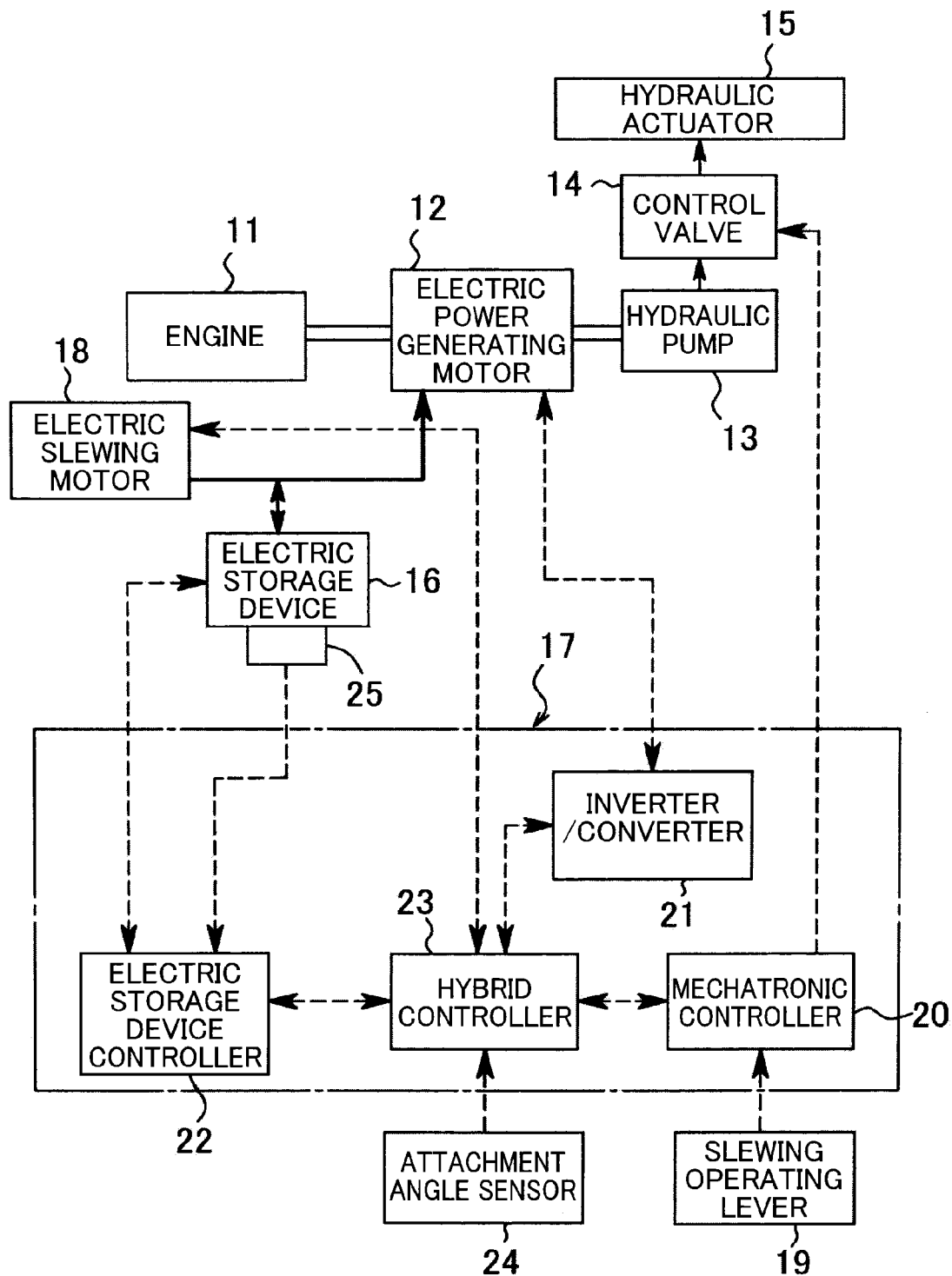
FIG. 7 is a block diagram illustrating a system as a second embodiment of the present invention.
Figure 8:
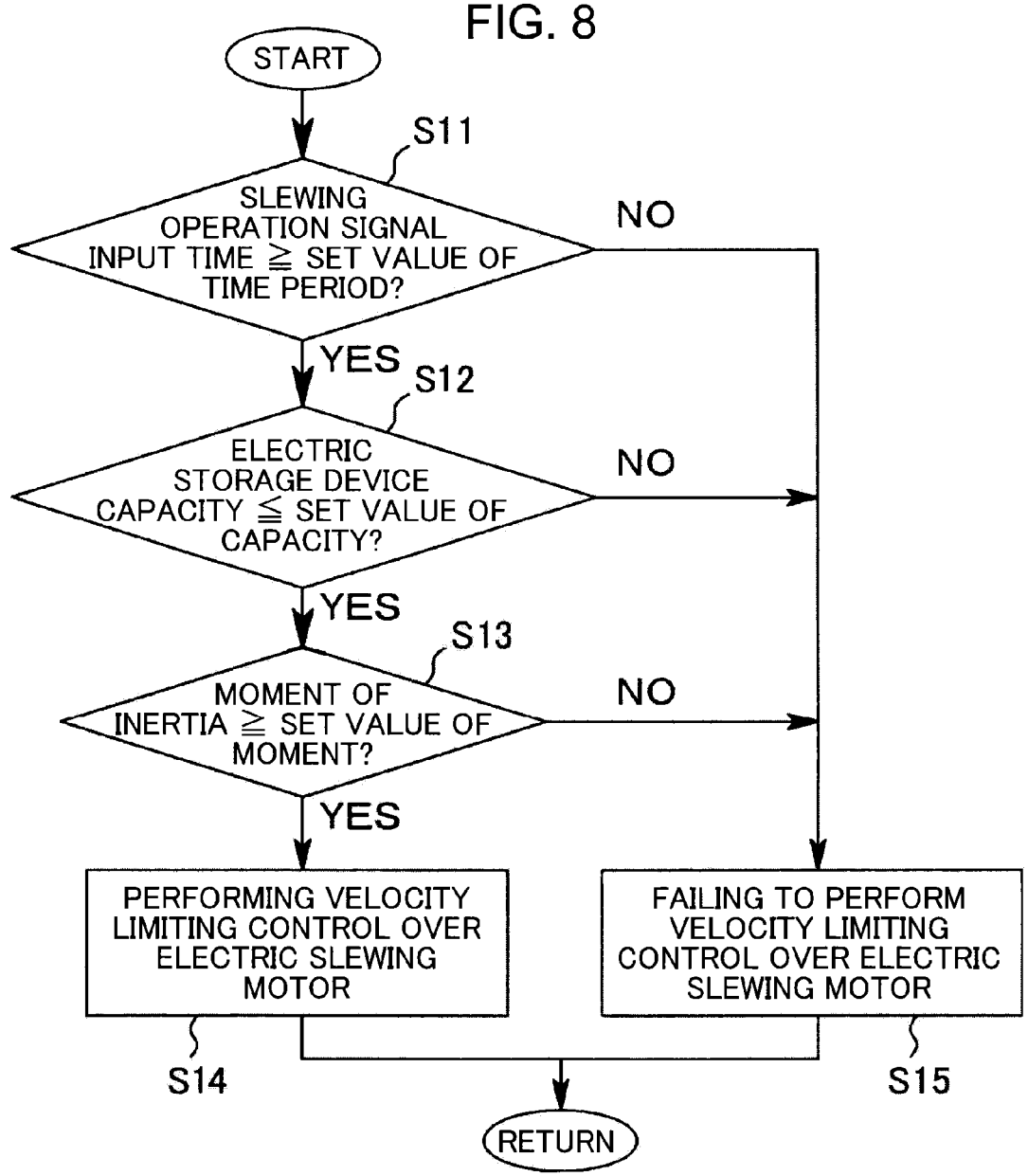
FIG. 8 is a flowchart illustrating an operation of the second embodiment.

See FIGS. 7 and 8

In the following second and third embodiments, description is made of only the features thereof which are different from the first embodiment.

The abnormal condition of the electric storage device 16 is also caused by a decrease in capacity due to the temperature and aging deterioration of the electric storage device 16.

The decrease in the capacity of the electric storage device 16 due to the aging deterioration can be avoided by maintenance management. The decrease in the capacity of the electric storage device 16 due to temperature, on the other hand, is hard to avoid.

Figure 9:
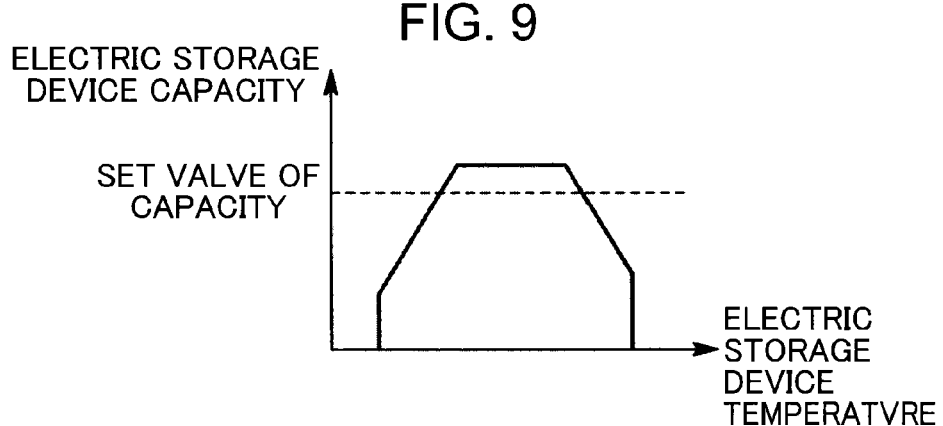
FIG. 9 is a diagram illustrating the relationship between the temperature of the electric storage device and the capacity of the electric storage device.

FIG. 9 illustrates the relationship between the electric storage device temperature and the electric storage device capacity. The electric storage device capacity decreases on the lower and higher temperature sides both.

In view of this, the second embodiment is provided with a temperature sensor (capacity detecting means: temperature detecting section) 25 for detecting the electric storage device temperature as shown in FIG. 7. The relationship between the electric storage device temperature and the electric storage device capacity (map: capacity information) shown in FIG. 9 is previously stored in the electric storage device controller 22 or hybrid controller 23. The electric storage device controller 22 or hybrid controller 23 determines the capacity of the electric storage device 16 based on the temperature detected by the temperature sensor 25 and the relationship shown in FIG. 9. That is, the electric storage device controller 22 or hybrid controller 23 forms a capacity determining section (capacity detecting means) in the present embodiment.

In the map, a set value of capacity is provided as a limit value of the electric storage device capacity at which an insufficient regeneration condition (condition which is short of regenerative braking force) is incurred at the time of slewing braking. The control means 17 determines that a condition in which the electric storage device capacity determined from the map is decreased to a value equal to or less than the set value of capacity is the abnormal condition and then performs the velocity limiting control over the electric slewing motor 18.

The process carried out by the control means 17 will be described with reference to the flowchart of FIG. 8. Steps S11 and S13 are the same as steps S1 and S3 of the first embodiment (FIG. 2).

In step S12, it is determined whether or not the electric storage device capacity determined from the electric storage device temperature detected by the temperature sensor 25 is equal to or less than the set value of capacity. If it is determined to be "YES" in step S12 and the moment of inertia is determined to be equal to or more than the set value of moment in step S13, the velocity limiting control is performed in step S14. On the other hand, if it is determined to be "NO" in at least one of steps S11 to S13, the velocity limiting control is not performed (step S15).

According to the second embodiment, insufficient regeneration (insufficient regenerative braking force) caused by the decrease in the capacity of the electric storage device 16 due to a drop or rise in temperature can be avoided. Therefore, it is possible to regenerate slewing energy with no waste, ensure a reliable slewing braking action and prevent the electric storage device 16 from being overcharged.

The electric storage device capacity may be determined from the quantity of electricity such as the voltage of the electric storage device 16. In this case, the electric storage device 16 and the electric storage device controller 22 form the capacity detecting means.

However, the arrangement for determining the electric storage device capacity from the electric storage device temperature as described above can realize more accurate capacity detection.

Third Embodiment

Figure 10:
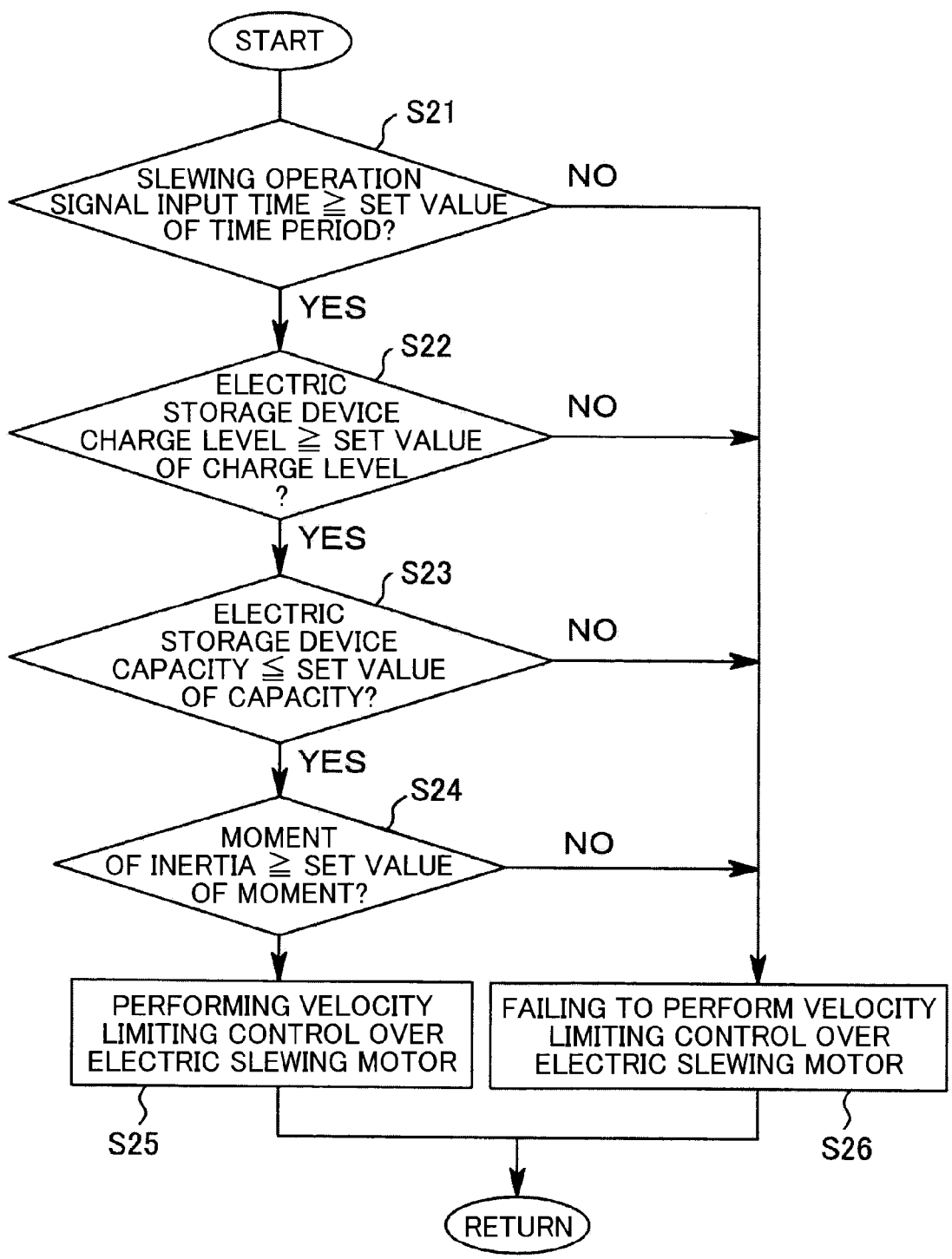
FIG. 10 is a flowchart illustrating an operation of a third embodiment of the present invention.

See FIG. 10

The system configuration of the third embodiment is the same as that of the second embodiment (FIG. 7). Therefore, the third embodiment will be described by quoting FIG. 7.

The third embodiment is a combination of the first embodiment and the second embodiment. Specifically, the third embodiment is configured to detect the charge level and capacity of the electric storage device 16 and perform the velocity limiting control over the electric slewing motor 18 when conditions for AND of the condition for determination of the charge level (step S22 of FIG. 10) and the condition for determination of the capacity (step S23 of FIG. 10) are met.

The process carried out by the control means 17 will be described with reference to the flowchart of FIG. 10. In the third embodiment, if it is determined to be "YES" in steps S21, S22, S23 and S24, the current condition is determined to be the abnormal condition and then the control for limiting the maximum velocity of the electric slewing motor 18 is performed.

Specifically, determination is made in step S21 as to whether or not the slewing operation signal input time is equal to or more than the set value of time period. In step S22, determination is made as to whether or not the charge level of the electric storage device 16 is equal to or more than the set value of charge level. In step S23, determination is made as to whether or not the capacity of the electric storage device 16 is equal to or less than the set value of capacity. In step S24, determination is made as to whether or not the moment of inertia of the working attachment A is equal to or more than the set value of moment.

If it is determined to be "NO" in at least one of steps S21 to S24, the current condition is determined to be the normal condition and, hence, the control for limiting the maximum velocity of the electric slewing motor 18 is not performed (step S26).

According to the third embodiment, the velocity limiting control over the electric slewing motor 18 is performed when the conditions for AND of the condition for determination of the charge level (step S22 of FIG. 10) and the condition for determination of the capacity (step S23 of FIG. 10) are met. For this reason, the abnormal condition of the electric storage device 16 can be determined more accurately. Therefore, useless velocity limiting can be avoided.

Figure 11:
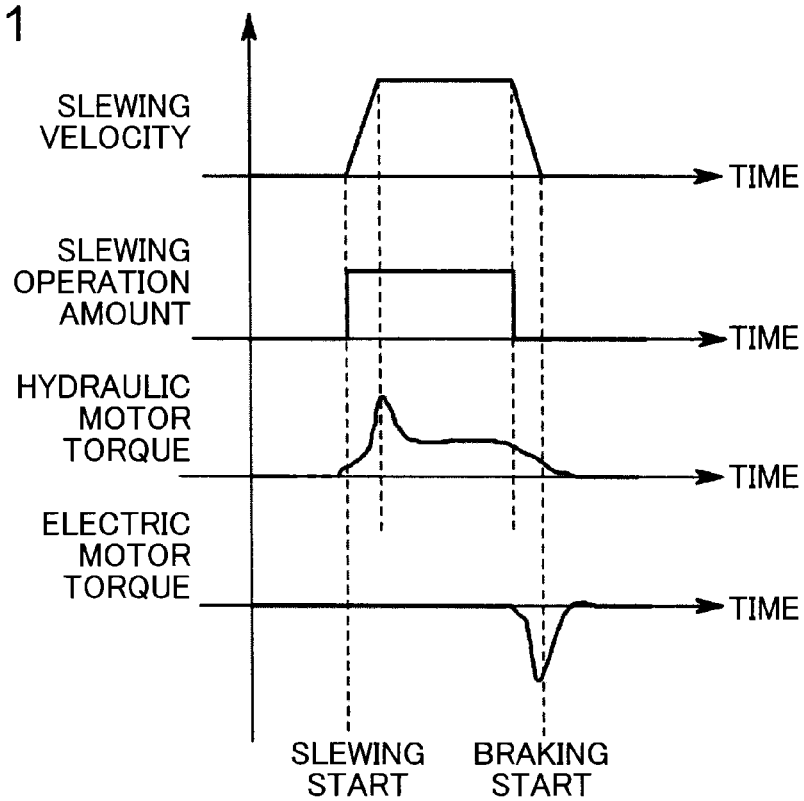
FIG. 11 is a diagram illustrating changes with time in slewing velocity, amount of slewing operation, hydraulic motor torque and electric motor torque under a normal condition according to a technique related to the present invention.
Figure 12:
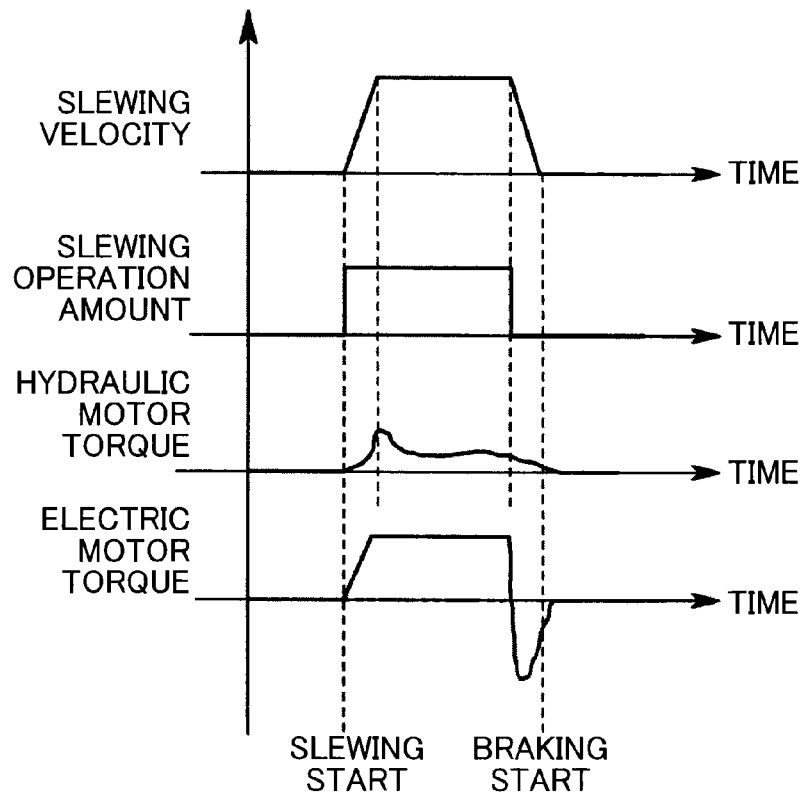
FIG. 12 is a diagram illustrating changes with time in slewing velocity, amount of slewing operation, hydraulic motor torque and electric motor torque under an abnormal condition according to the technique mentioned above.

A technique illustrated in FIGS. 11 and 12 is conceivable in relation to the present invention.

The technique is for use in a shovel having a hydraulic motor and an electric motor as slewing driving sources and is adapted to limit the electric storage device charge level itself by increasing the rate of operation of the electric motor when the electric storage device charge level is high.

FIG. 11 illustrates changes with time in slewing velocity, amount of slewing operation, hydraulic motor torque and electric motor torque from the start of slewing under a condition with sufficient capacity to charge, having a electric storage device charge level of equal to or less than a certain value.

In the case of FIG. 11, the slewing operation is driven only by the hydraulic motor, while the electric motor performs a regenerating operation during slewing braking. Thus, regenerative braking force and regenerative electric power are generated.

FIG. 12 illustrates changes with time in slewing velocity, amount of slewing operation, hydraulic motor torque and electric motor torque from the start of slewing under a condition with insufficient capacity to charge, having a electric storage device charge level of more than the certain value.

In the case of FIG. 12, the slewing operation is performed using both of the hydraulic motor and the electric motor from the start of the slewing operation to increase the amount of discharge of the electric storage device, thereby lowering the charge level. That is, the rate of operation of the electric motor is increased.

The case of FIG. 12 is similar to that of FIG. 11 in that the electric motor performs a regenerating operation during slewing braking.

In this way, the frequency with which the velocity limiting control is performed over the electric motor can be decreased by lowering the charge level of the electric storage device itself. Further, the hydraulic pressure consuming power can be reduced by increasing the rate of operation of the electric motor, thereby obtaining an energy-saving effect.

It is possible that the slewing operation is driven by using the hydraulic motor and the electric motor in a combined manner while the rate of operation of the electric motor is raised when the electric storage device charge level exceeds the certain value.

The present invention is applicable to shovels as well as other slewing-type working machines including a dismantling machine and a crushing machine which are each constructed from a shovel as a parent machine by replacing a part or the whole of the working attachment of the shovel.

The above-described specific embodiments mainly include the invention having the following features.

That is, the present invention provides a slewing-type working machine including: a lower propelling body; a upper slewing body rotatably provided on the lower propelling body; an electric slewing motor causing the upper slewing body to slew, and generating regenerative braking force and regenerative electric power during slewing braking of the upper slewing body; a electric storage device functioning as an electric power source for the electric slewing motor, and capable of being charged with the regenerative electric power to regenerate slewing energy of the upper slewing body; electric storage device condition detecting means detecting whether the electric storage device is under a normal condition with sufficient capacity to regenerate the slewing energy or under an abnormal condition without sufficient capacity; and control means controlling a velocity of the electric slewing motor based on a result of detection by the electric storage device condition detecting means, wherein the control means performs a velocity limiting control for limiting a maximum velocity of the electric slewing motor when the electric storage device is under the abnormal condition.

According to the present invention, the maximum velocity of the electric slewing motor is limited when the electric storage device is under the abnormal condition with no sufficient capacity to regenerate the slewing energy during the slewing braking. That is, under a situation in which the slewing energy is excessive relative to the condition of the electric storage device, slewing energy to be newly generated is limited. For this reason, the present invention makes it possible to prevent the electric storage device from being overcharged as well as to ensure a reliable slewing braking force by efficiently regenerating energy.

In the slewing-type working machine, it is preferable that: the electric storage device condition detecting means has charge level detecting means detecting a charge level of the electric storage device; and the control means determines that the electric storage device is under the abnormal condition when the charge level detected by the charge level detecting means is equal to or more than a preset charge level value and performs the velocity limiting control.

In this aspect, the velocity limiting control is performed when the charge level detected by the charge level detecting means is equal to or more than the set value of charge level. The abnormal condition of the electric storage device takes place when there is no leeway to take in regenerative electric power because of a high charge level. For this reason, the aspect described above is capable of reliably determining whether or not the electric storage device is under the abnormal condition.

Particularly when the set value of charge level is set to a limit value at which the electric storage device falls into an insufficient regeneration condition (condition which is short of regenerative braking force), the electric storage device can be reliably prevented from falling into the insufficient regeneration condition.

In the slewing-type working machine, it is preferable that: the electric storage device condition detecting means has capacity detecting means detecting a capacity of the electric storage device; and the control means determines that the electric storage device is under the abnormal condition when the capacity of the electric storage device detected by the capacity detecting means is equal to or less than a preset capacity value and performs the velocity limiting control of the electric slewing motor.

In this aspect, the velocity liming control is performed when the capacity of the electric storage device detected by the capacity detecting means is equal to or less than the set value of capacity. The abnormal condition of the electric storage device is also caused by a decrease in the capacity of the electric storage device due to temperature, aging deterioration or the like. For this reason, the aspect described above is capable of reliably determining whether or not the electric storage device is under the abnormal condition.

Particularly when the set value of capacity is set to a limit value at which the electric storage device falls into the insufficient regeneration condition (condition which is short of regenerative braking force), the electric storage device can be reliably prevented from falling into the insufficient regeneration condition.

In this case, the velocity limiting may be performed based on only the capacity of the electric storage device. Alternatively, the velocity limiting may be performed by taking the condition in which the charge level of the electric storage device is equal to or more than the set value into consideration in addition to the condition in which the capacity of the electric storage device is equal to or less than the set value. With the latter arrangement, the abnormal condition of the electric storage device can be determined more accurately and, hence, useless velocity limiting can be avoided.

In the slewing-type working machine, preferably, the capacity detecting means detects a temperature of the electric storage device and determines the capacity of the electric storage device based on the detected temperature.

In this aspect, the capacity of the electric storage device is determined based on the temperature of the electric storage device. For this reason, even when the capacity of the electric storage device is decreased due to temperature, the velocity limiting control can be performed reliably. Of several electric storage device capacity decreasing factors, the capacity decrease due to temperature in particular is hard to avoid, though the decrease due to aging deterioration can be alleviated by maintenance management. For this reason, the aspect described above in which the velocity limiting control is performed in accordance with change in the capacity of the electric storage device due to temperature is useful.

Specifically, the capacity detecting means may have a temperature detecting section detecting the temperature of the electric storage device and a capacity determining section which stores in advance capacity information indicative of a relationship between the temperature of the electric storage device and the capacity of the electric storage device and which determines the capacity of the electric storage device based on the temperature of the electric storage device detected by the temperature detecting section and the capacity information.

In this aspect, for example, it is possible that the correlation between the temperature of the electric storage device and the capacity of the electric storage device is previously set as a map or the like and the capacity of the electric storage device is determined based on the detected temperature. This can reliably accommodate to the decrease in capacity due to temperature.

Preferably, the slewing-type working machine further includes moment-of-inertia detecting means detecting a moment of inertia of a working attachment fitted on the upper slewing body, wherein the control means performs the velocity limiting control when the electric storage device is under the abnormal condition and when the moment of inertia of the working attachment detected by the moment-of-inertia detecting means is equal to or more than a preset value.

The slewing energy and the braking energy opposed thereto vary with the moment of inertia of the working attachment. Therefore, similarly to the above aspect, reliable velocity limiting can be realized with no waste by performing the velocity limiting when the electric storage device is under the abnormal condition and when the moment of inertia is equal to or more than the set value.

In the slewing-type working machine, preferably, the electric storage device condition detecting means preferably starts detecting whether or not the electric storage device is under the normal condition or the abnormal condition after lapse of a predetermined time period from start of a slewing operation.

Immediately after the start of the slewing operation, the voltage of the electric storage device is subjected to fluctuation (drop and the like). For this reason, by detecting the condition of the electric storage device after lapse of the predetermined time period from the start of the slewing operation as in the aspect described above, the condition of the electric storage device can be prevented from being erroneously detected, which allows accurate velocity limiting to be performed.

Preferably, the slewing-type working machine further include a slewing operating section outputting a velocity command to the electric slewing motor, wherein the control means sets a velocity gain relative to an amount of operation such that the velocity of the electric slewing motor varies continuously in accordance with the amount of operation of the slewing operating section over an entire operation range of the slewing operation section while the velocity of the electric slewing motor at a maximum amount of operation of the slewing operating section reaches the limited maximum velocity.

A conceivable method of limiting the maximum velocity of the electric slewing motor includes holding the slewing velocity of the electric slewing motor constant (at a limit value) irrespective of an increase in the amount of operation by the slewing operating section during a time period from a point in time at which the slewing velocity reaches a limited upper value and thereafter.

With this method, however, the slewing velocity stops increasing in the middle of operation of the slewing operating section. For this reason, the operator feels a gap from the slewing operation under the normal condition, while there is some fear of degradation in operability.

In view of this, the aspect described above is configured to set a velocity gain relative to an amount of operation such that the velocity of the electric slewing motor varies continuously in accordance with the amount of operation of the slewing operating section over the entire operation range of the slewing operation section while reaching the limited maximum velocity at the maximum amount of operation of the slewing operating section. This allows the gap from the slewing operation under the normal condition to be lessened, thereby bettering the operability.

INDUSTRIAL APPLICABILITY

According to the present invention, it is possible to prevent the electric storage device from being overcharged as well as to obtain an appropriate slewing braking force by efficiently regenerating slewing energy during slewing braking.

A working attachment
Cs preset charge level value
Vl limit value
1 lower propelling body
2 upper slewing body
3 boom
4 arm
5 bucket
11 engine
12 electric power generating motor
13 hydraulic pump
14 control valve
15 hydraulic actuator
16 electric storage device (charger condition detecting means, charge level detecting means, capacity detecting means)
17 control means
18 electric slewing motor
19 slewing operating lever (slewing operating section)
20 mechatronic controller
21 converter
22 electric storage device controller (charger condition detecting means, charge level detecting means, capacity detecting means, capacity determining section)
23 hybrid controller (moment-of-inertia detecting means, capacity detecting means, capacity determining section)
24 attachment angle sensor (moment-of-inertia detecting means)
25 temperature sensor (capacity detecting means, temperature detecting section)

The invention claimed is:
1. A slewing-type working machine comprising:
a lower propelling body;
a upper slewing body rotatably provided on the lower propelling body;
an electric slewing motor causing the upper slewing body to slew, and generating regenerative braking force and regenerative electric power during slewing braking of the upper slewing body;
a electric storage device functioning as an electric power source for the electric slewing motor, and capable of being charged with the regenerative electric power to regenerate slewing energy of the upper slewing body;
electric storage device condition detecting means detecting whether the electric storage device is under a normal condition with sufficient capacity to regenerate the slewing energy or under an abnormal condition without sufficient capacity; and control means controlling a velocity of the electric slewing motor based on a result of detection by the electric storage device condition detecting means, wherein the control means performs a velocity limiting control for limiting a maximum velocity of the electric slewing motor when the electric storage device is under the abnormal condition.

2. The slewing-type working machine according to claim 1, wherein the electric storage device condition detecting means has charge level detecting means detecting a charge level of the electric storage device; and the control means determines that the electric storage device is under the abnormal condition when the charge level detected by the charge level detecting means is equal to or more than a preset charge level value and performs the velocity limiting control.

3. The slewing-type working machine according to claim 1, wherein the electric storage device condition detecting means has capacity detecting means detecting a capacity of the electric storage device; and the control means determines that the electric storage device is under the abnormal condition when the capacity of the electric storage device detected by the capacity detecting means is equal to or less than a preset capacity value and performs the velocity limiting control of the electric slewing motor.

4. The slewing-type working machine according to claim 3, wherein the capacity detecting means detects a temperature of the electric storage device and determines the capacity of the electric storage device based on the detected temperature.

5. The slewing-type working machine according to claim 4, wherein the capacity detecting means has a temperature detecting section detecting the temperature of the electric storage device and a capacity determining section which stores in advance capacity information indicative of a relationship between the temperature of the electric storage device and the capacity of the electric storage device and which determines the capacity of the electric storage device based on the temperature of the electric storage device detected by the temperature detecting section and the capacity information.

6. The slewing-type working machine according to claim 1, further comprising moment-of-inertia detecting means detecting a moment of inertia of a working attachment fitted on the upper slewing body, wherein the control means performs the velocity limiting control when the electric storage device is under the abnormal condition and when the moment of inertia of the working attachment detected by the moment-of-inertia detecting means is equal to or more than a preset value.

7. The slewing-type working machine according to claim 1, wherein the electric storage device condition detecting means starts detecting whether or not the electric storage device is under the normal condition or the abnormal condition after lapse of a predetermined time period from start of a slewing operation.

8. The slewing-type working machine according to claim 1, further comprising a slewing operating section outputting a velocity command to the electric slewing motor, wherein the control means sets a velocity gain to an amount of operation such that the velocity of the electric slewing motor varies continuously in accordance with the amount of operation of the slewing operating section over an entire operation range of the slewing operation section while the velocity of the electric slewing motor at a maximum amount of operation of the slewing operating section reaches the limited maximum velocity.

* * * * *